Sept. 3, 1940.    F. W. DAVIS    2,213,271
POWER STEERING APPARATUS
Filed March 23, 1938    2 Sheets-Sheet 1

Inventor
Francis W. Davis
by Wright, Brown, Quinby & May
Attys.

Sept. 3, 1940.  F. W. DAVIS  2,213,271
POWER STEERING APPARATUS
Filed March 23, 1938  2 Sheets-Sheet 2
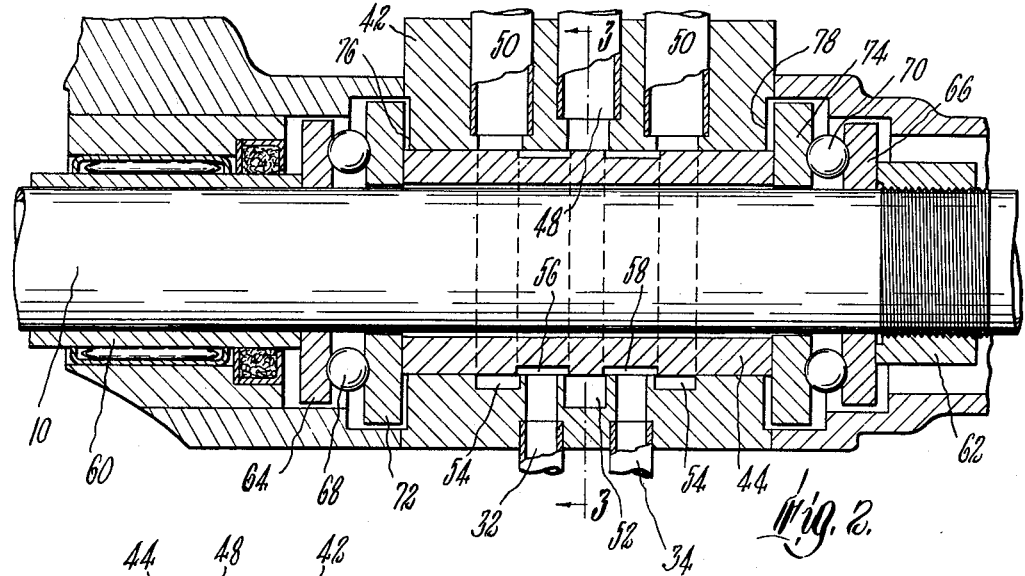
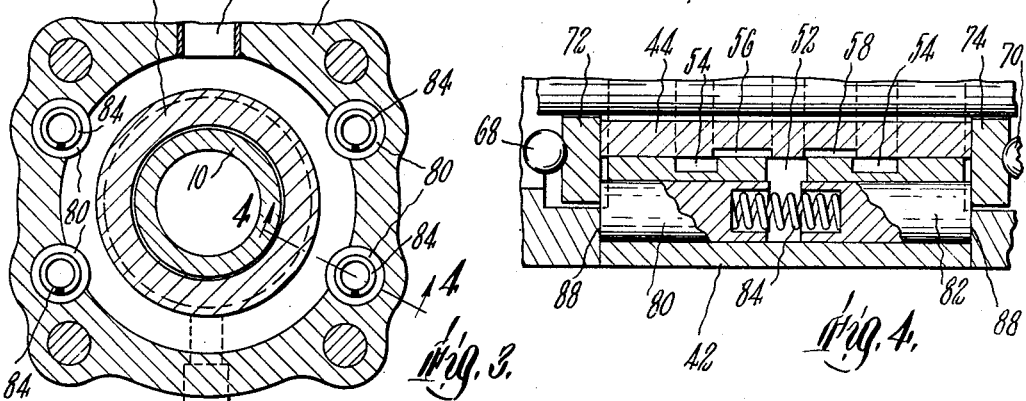
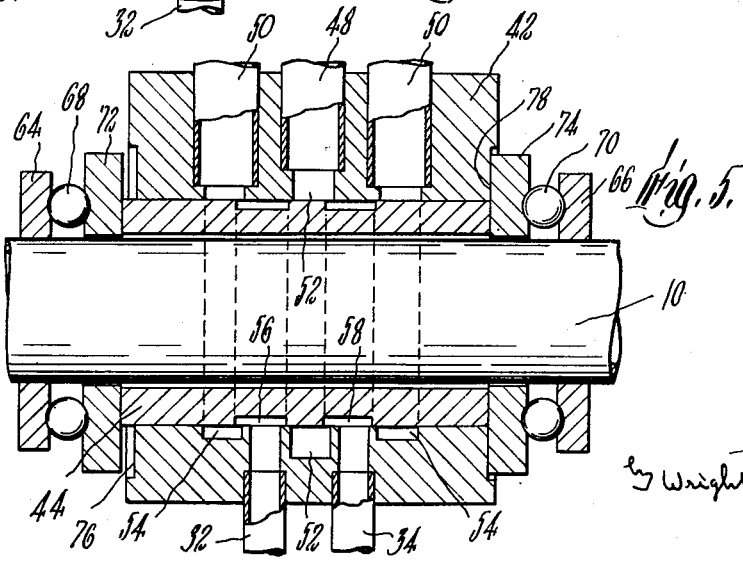
Inventor
Francis W. Davis
by Wright, Brown, Quinby May
Attys.

Patented Sept. 3, 1940

2,213,271

UNITED STATES PATENT OFFICE 2,213,271

POWER-STEERING APPARATUS

Francis W. Davis, Belmont, Mass.

Application March 23, 1938, Serial No. 197,542

9 Claims. (Cl. 180—79.2)

This invention relates to power-steering mechanism, particularly for self-propelled vehicles such as automobiles, trucks, busses, aeroplanes and the like.

The invention relates more especially to apparatus of the type illustrated and described in my Letters Patent No. 1,937,470 issued on November 28, 1933. The apparatus therein described is characterized by an "open valve" type of control for the power fluid, that is, a circulation system for the power fluid in which the fluid is caused to flow continuously through a circuit which includes a control valve. Within the valve the stream divides into a plurality of branch streams at the valve inlet, these streams reuniting at the valve outlet. Each of these streams is continuously in communication with one side of a fluid motor by which power is applied for steering purposes.

According to the present invention, structural improvements are made in the mechanism, particularly in the control valve and the centering means by which the valve members are held in a relatively central or neutral position until steering resistance exceeds a predetermined maximum. As hereinafter described more in detail, the centering means includes elements movable in the same direction as the movable portion of the valve, these elements being both spring pressed and also exposed to fluid pressure at the valve inlet so that the fluid pressure itself is effective to retain the valve members in their neutral position or to restore them to neutral position when moved therefrom.

For a more complete understanding of the invention, reference may be had to the description thereof which follows, and to the drawings of which Figure 1 is a side elevation of a power-steering mechanism, parts being broken away to show interior members.

Figure 2 is a sectional view of the control valve illustrated in Figure 1, the parts being shown in their central or neutral position.

Figure 3 is a section on the line 3—3 of Figure 2.

Figure 4 is a section on the line 4—4 of Figure 3.

Figure 5 is a sectional view similar to a portion of Figure 2 but showing the valve members in a different relative position.

Figure 1:
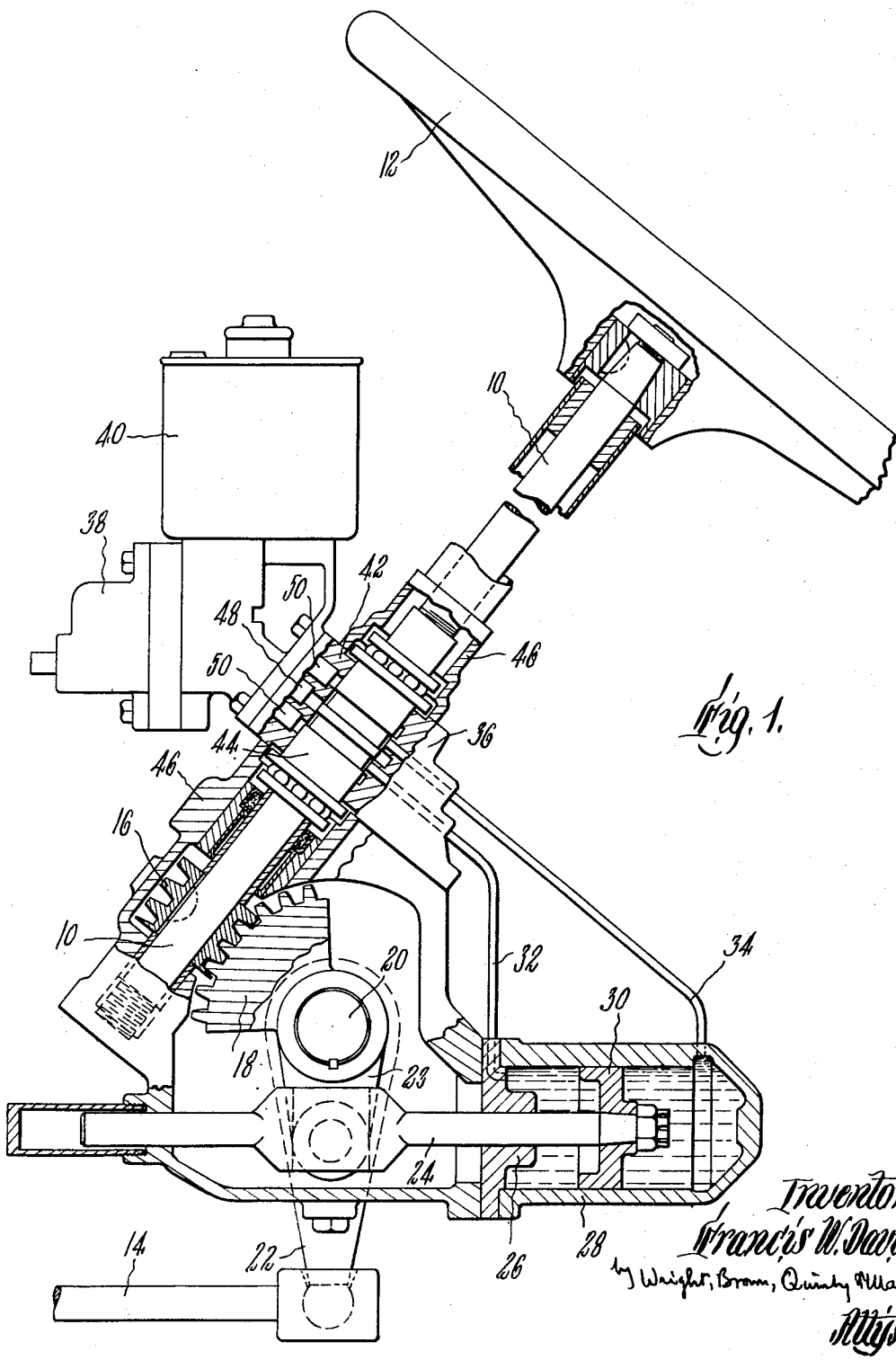

Figure 1 illustrates a fluid power-steering mechanism comprising a steering shaft 10 to the upper end of which is secured a steering wheel 12. This shaft is mechanically connected to a reciprocable rod or drag-link 14 for deflection of the steered vehicle wheels. The mechanical connection between the shaft 10 and the drag-link 14 is preferably such as to convert rotational movement of the shaft into an axial thrust thereof by which the drag-link 14 is longitudinally moved in one direction or the other. To this end, the connection means may include suitable cam means such, for example, as a worm 16 fixed upon the shaft 10 and meshing with a gear sector 18 mounted on a cross shaft 20. A crank arm 22 projects from the shaft 20 and is connected to the drag-link by a suitable articulated joint. Manual rotation of the shaft 10 by means of the steering wheel 12 results in rocking movement of the cross shaft 20 and longitudinal movement of the drag-link 14. Thus, in the absence of power, the vehicle is manually steered in the usual manner. For power actuation of the cross shaft 20, an arm 23 projects therefrom within the casing and has a pin and slot connection with a piston rod 24 which extends through a suitable gland 26 into a fluid motor consisting of a power cylinder 28 within which a piston 30 is secured to the end of the rod 24. Power fluid is brought by pipes 32 and 34 to the ends of the cylinder 28 and serve alternately as supply and discharge ducts for power actuation of the piston 30 in either direction. These pipes lead from a control valve generally indicated at 36. A suitable fluid pump 38 is indicated in outline in Figure 1, as well as a supply reservoir 40 communicating with the return line to the pump for excess liquid where a liquid is employed as the power fluid. Since it is usually desirable to eliminate elasticity from the power system as completely as possible, it is preferable to employ a suitable liquid such as an oil or a glycerine mixture as the power fluid. For convenience, such liquid is hereinafter referred to as oil, but it is to be understood that any suitable liquid may be employed for the purpose.

Within the pump or reservoir a by-pass (not shown) connects the high pressure and low pressure sides of the pump, this by-pass having a check valve therein permitting ready relief of any pressure in the suction line over the pressure in the delivery line (as when the pump is not operating and the vehicle is being steered by hand), and a spring-loaded relief valve permitting escape of excessive pressure in the delivery line. These relief valves are not illustrated on the drawings but may be constructed and arranged as shown, for example, in my said Patent No. 1,937,470.

The control valve 36, as shown, includes an outer member 42 and an inner member 44 nested therein and capable of a slight axial movement relative thereto in either direction from a central or neutral position such as is illustrated in Figures 1 and 2. The outer valve member 42 is stationary with respect to the vehicle itself, and may constitute a portion of a housing 46 which encloses the shaft 10 and worm 16. Within the valve member 42 is an inlet duct 48 leading from the high pressure side of the pump 38. A pair of outlet ducts 50 lead back to the suction side of the pump 38. In the valve structure illustrated on the drawings, the outer valve member 42 surrounds the inner valve member 44, the latter being slidably fitted within the former. The inner member 44 surrounds a portion of the steering shaft 10, the shaft being rotatable with respect to the member 44, so that, when the shaft is rotated for steering the vehicle, there is ordinarily little, if any, rotation of the inner valve member 44. The valve members are provided with cooperating channels in their opposed cylindrical faces. The outer valve member 42 thus has an annular inlet channel 52 in its inner face, which constantly communicates with the inlet duct 48, and a pair of annular discharge channels 54 which constantly communicate with the two discharge ducts 50. The inner valve member is provided with a pair of annular channels 56 and 58 in its outer cylindrical face, each of these channels being of sufficient width to overlap slightly, i. e. a few thousandths of an inch, the adjacent edges of the inlet channel 52 and one of the discharge channels 54. Such overlap results in narrow annular apertures through which the channels communicate for the circulation of the oil. Corresponding apertures in the two branches are equal when the valve members are in central or neutral relative position as illustrated in Figure 2 to produce a balanced flow from the inlet duct 48 to the two outlet ducts 50. Thus, the inlet stream which enters the inlet channel 52 is divided, one branch stream flowing through the channel 56 to the corresponding outlet 50 and the other branch stream flowing through the channel 58 to the other outlet duct 50. These two streams then reunite and return to the suction end of the pump. The branch streams are constantly connected respectively with the opposite ends of the motor cylinder 28. To this end, the pipe 32 is constantly in communication with the channel 56, the pipe 34 being in constant communication with the channel 58. Thus the pressure conditions in the chambers on either side of the piston 30 are always instantly responsive to pressure conditions in the branch channels 56 and 58, respectively.

The inner valve member 44 is arranged to partake of any and every axial movement of the shaft 10. To this end, suitable collars 60 and 62 are fixed upon the shaft 10 so as to back a pair of frictionless elements such as ball races 64 and 66 having ball bearings 68 and 70 engaging the outer faces of a pair of end flanges 72 and 74 on the member 44. This construction, which is clearly illustrated in Figure 2, permits free rotation of the shaft 10 relative to the valve member 44, but any axial movement of the shaft 10 results in similar axial movement of the valve member 44 therewith. The outer valve member 42 is provided with a pair of shoulders 76 and 78 which are normally spaced a small distance from the adjacent end flanges 72 and 74 of the inner valve member. When the inner valve member moves axially, the range of such movement is limited by engagement of its end flanges with these shoulders of the outer member, the total extent of such axial movement being preferably a small fraction of an inch. This definitely limits also the range of axial movement of the shaft 10. Axial movement of the shaft and the inner valve member 44 results in actuation of the valve to disturb the balanced flow in the branch streams and to cause the motor 28 to operate as hereinafter described more in detail.

The operation of the valve itself is as follows. When the valve is in its neutral position such as is illustrated in Figure 2, the constantly flowing stream of oil propelled by the pump 38 enters the valve through the inlet duct 48. The oil flows into the inlet channel 52 and thence into the branch channels 56 and 58. From these channels the oil flows respectively into the two discharge channels 54 and thence into the discharge ducts 50, the flow in these two branch streams being exactly balanced so that the pressure conditions in the pipes 32 and 34, and hence in the pressure chambers in the motor 28, are likewise balanced. If the movable valve member 44 is axially moved in the slightest amount from its neutral position relative to the stationary member 42, the flow into one of the branch channels, e. g. the channel 56, is throttled down by a decrease in the annular aperture between that channel and the inlet channel 52, the aperture to the branch channel 58 being simultaneously increased. At the same time the aperture between the channel 58 and the corresponding discharge channel 54 is likewise throttled and the discharge aperture of the channel 56 is increased so that the balance of the flow is disturbed and pressure is increased on one side of the piston 30 and decreased on the other side. If the inner valve member 44 moves to an extreme position, one of the branch channels is cut off entirely from its outlet channel 54. For example, if the movable member 44 moves to its extreme position toward the left, as illustrated in Figure 5, the branch channel 56 is cut off entirely from the inlet channel 52 but its connection with the discharge channel 54 is opened up to a maximum. On the other hand, the branch channel 58 is cut off entirely from its discharge channel 54 but its connection with the inlet channel 52 is opened to its maximum. Under such conditions, it is evident that the entire incoming stream through the inlet duct 48 is directed through the branch channel 58 and the pipe 34 to the right-hand end of the motor cylinder 28, thus tending to push the piston 30 toward the left. At the same time the left-hand end of the cylinder 28 is opened up through the pipe 32 and the branch channel 56 to the corresponding discharge channel 54 so that escape of oil from the left-hand end of the cylinder is facilitated. It is obvious that, when the valve member 44 is moved toward the right, these conditions are reversed. When the valve is in its neutral position, the oil flows therethrough with maximum freedom and there is a minimum load on the pump. Any movement of the valve member 44 from neutral position results in a throttling of both branch channels, resulting in a build-up of pressure in the inlet channel 52, such pressure varying in accordance with the amount of displacement of the valve member 44 from its neutral position. In extreme cases of steering resistance sufficient to close both branch channels as described above, or when the piston reaches either end of its stroke, oil pressure in the inlet channel may build up to the maximum for which the relief valve is set.

According to the invention, improved means are provided for yieldingly maintaining the two valve members in their relatively central or neutral position, that is, the position illustrated in Figure 2. To this end, a suitable number of pairs of alined plungers 80 and 82 are provided as illustrated in Figures 3 and 4. In the structure shown on the drawings, four such pairs of plungers are provided, these plungers being slidably fitted into bores which are located in the outer valve member 42 and are parallel with the axis of the shaft and valve. Each of these bores also communicates with the inlet channel 52. In each bore is a pair of plungers 80 and 82, the adjacent ends of the plungers being pressed apart by a compressed spring 84. These adjacent ends are also exposed to fluid pressure within the inlet channel 52 so that whatever pressure is present at any time at the valve inlet is operative against the adjacent ends of each pair of plungers to press apart such plungers. When the valve member 44 is in its neutral position, the mutually remote ends of the plungers 80 and 82 are in engagement with the end flanges 72 and 74, respectively, and also with suitable opposed shoulders 88 within the outer valve member 42. Thus, if either end flange of the member 44 moves away from its adjacent plungers, the shoulders 88 prevent those plungers from following the end flange. The maximum steering effect required to turn the steering wheel 12 is that necessary to overcome steering resistance sufficient to produce axial movement of the shaft and the valve member 44. It is evident from Figure 4 that an axial movement of the member 44 in either direction must necessarily be against the initial force of compression of the springs 84 plus a force proportional to the fluid pressure in the inlet channel 52. For example, if the valve member 44 moves toward the left as shown in Figure 5, the plungers 80 cannot move toward the left with the valve member 44 since any such movement is prevented by the shoulders 88. The plungers 82, however, must move toward the left with the valve member 44 since the end of the flange 74 bears against the right-hand ends of the plungers 82. Hence such movement of the valve member 44 must be against the combined compressive forces of the springs 84 as well as against the liquid pressure in the inlet channel 52 which acts against the exposed end faces of the plungers 82. By suitable selection of the springs 84, the valve may be preloaded by any desired amount, and the valve will not operate unless the steering resistance is of sufficient magnitude to overcome the resistance of the springs 84 and the fluid pressure in the inlet channel.

The operation of the steering mechanism as a whole can be seen from Figure 1. Rotation of the shaft 10 by the steering wheel 12 causes rotation of the worm 16 which meshes with the gear sector 18. This connection converts the rotation of the shaft 10 into an axial thrust of the shaft exerted on the teeth of the gear sector 18 so as to tend to rock the cross shaft 20. It is obvious that any resistance on the part of the cross shaft 20 will result in a reactionary axial thrust on the shaft 10 tending to impart axial movement to the shaft. If this reactionary thrust is sufficient to overcome the resistance of the centering means in the valve, then the valve will be operated to cause actuation of the motor by a variation from the normally balanced flow of power fluid through the branch channels in the valve, the motor being operated in a direction to restore the valve member 44 to its neutral position. For example, if the steering wheel 12 is rotated to the right, the worm 16 tends to rock the gear sector 18 and the cross shaft 20 in a clockwise direction as shown in Figure 1. This results in a reactionary downward thrust on the shaft 10. If this thrust is of sufficient magnitude to move the valve member 44 from its neutral position, this member will move toward the position illustrated in Figure 5, thus augmenting the pressure in the right-hand end of the cylinder 28. This pressure moves the piston 30 toward the left, rocking the cross shaft 20 in a clockwise direction sufficiently to restore the valve member 44 to its neutral position.

It is evident that various modifications and changes may be made in the embodiment of the invention herein illustrated and described without departing from the spirit or scope of the invention as described in the following claims.

I claim:

1. In a steering mechanism for self-propelled vehicles, a manually rotatable steering shaft having a limited axial movement, a steered part, a fluid motor operatively connected to said steered part, mechanical connecting means between said shaft and steered part including a member mounted on said shaft and a cooperating member engaged thereby and movable by axial movement of the shaft and also by rotation of the shaft, and a valve controlling said motor and actuated by axial movement of said shaft.

2. In a steering mechanism for self-propelled vehicles, a manually rotatable steering shaft having a limited axial movement, means yieldingly opposing axial movement of said shaft from a normal intermediate position, a steered part, a fluid motor operatively connected to said steered part, mechanical connecting means between said shaft and steered part including a member mounted on said shaft and a cooperating member engaged thereby and movable by axial movement of the shaft and also by rotation of the shaft, and a valve controlling said motor and actuated by axial movement of said shaft.

3. A steering mechanism for self-propelled vehicles, comprising a manually rotatable shaft having a limited axial movement, a power-actuable member, gear means operably connecting said shaft and member for manual operation of said member, a fluid motor connected to said member for actuation thereof, and a fluid circulation system connected to said motor and including a control valve concentric with said shaft comprising a stationary element and an element axially movable by and with axial movement of said shaft.

4. A steering gear for self-propelled vehicles, comprising a manually rotatable steering member mounted so as to have a limited axial movement, a steered part movable in opposite directions to guide the vehicle, means for converting rotation of said member into an axial thrust to move said steered part, a fluid motor connected to said steered part for power operation of the same, a control valve communicating with said motor and comprising a stationary member and a cooperating member connected to said steering member so as to partake of any axial movement thereof for the operation of the valve, and means for maintaining a continuous flow of power fluid through said valve.

5. In a steering mechanism for self-propelled vehicles, a steered part, a fluid motor operatively connected to said steered part for power actuation thereof, a manually movable steering member operatively connected to said steered part for manual operation thereof, a control valve constantly communicating with said motor and comprising two parts one of which is movable relatively to the other from a neutral relative position to direct the flow of fluid through the valve, means for maintaining a continuous flow of fluid through the valve, and centering means movable in the direction of movement of the movable valve part and exposed to fluid pressure at the inlet to the valve whereby to oppose any movement of said movable valve part from its neutral position.

6. In a steering mechanism for self-propelled vehicles, a motor, a power fluid circulation system connected to said motor and including valve means for controlling the flow of fluid through said system, said means having a fluid supply duct and a fluid discharge duct, a pair of branch ducts leading from said supply duct to said discharge duct in parallel, a connecting duct from each branch duct to said motor, said connecting ducts serving alternatively as supply and discharge ducts for said motor to operate the motor in either direction, said valve means including also a member movable from a neutral position in which the fluid flow through the valve is equally divided between said branch ducts to simultaneously cut off one branch duct from its inlet duct and the other branch duct from its outlet duct, and valve-centering elements within the valve movable by said valve member in the same direction therewith when said valve member moves from its neutral position, said elements being exposed to the fluid pressure at the entrance of said valve means whereby the fluid pressure in the inlet of the valve is utilized to oppose any movement of said valve member from its neutral position.

7. In a steering mechanism, a manually rotatable shaft having a slight axial movement, a power driven member, means mechanically connecting said shaft and member for manual operation of said member, a control valve having two cooperating parts one of which is stationary while the other is axially movable by and with axial movement of said shaft from a neutral position relative to the stationary part to operate the valve, said valve having a fluid inlet duct, a fluid outlet duct, a pair of branch ducts extending from the inlet to the outlet duct and a pair of connecting ducts extending from respective branch ducts to the motor for the operation thereof in either direction, and means responsive to fluid pressure at said inlet for opposing movement of said movable valve part from its neutral relative position.

8. In a steering mechanism operable by fluid power, a manually rotatable steering shaft having a limited axial movement, a control valve for power fluid including a member surrounding a portion of said shaft and axially movable therewith and a stationary member surrounding said movable valve member and cooperating therewith to control the flow of power fluid through the valve when the movable member moves in either direction from a central position relative to the stationary member, said valve members having cooperating channels and ducts therein including an annular inlet channel in the interior face of said stationary member, and an inlet duct communicating therewith, and centering means for said movable member comprising pairs of alined plungers arranged parallel to the axis of the shaft, a compressed spring between the adjacent end faces of the plungers of each said pair, said adjacent end faces being directly exposed to fluid in said inlet channel, a pair of opposed shoulders within said stationary valve member, and a pair of end flanges on the movable member engaged by the remote end faces of said plungers when the movable member is in its central position, whereby any movement of said movable member from its central position moves only the plungers engaging one of the end flanges and such movement is against the combined compressive forces of said springs and the fluid pressure in the inlet.

9. In a fluid control valve comprising a pair of nested cylindrical members relatively movable from a central relative position to control the flow of power fluid therethrough, said members having cooperating channels and ducts including an annular inlet channel in the interior face of the outer of said nested members and an inlet duct communicating therewith, means yieldingly maintaining said members in their central relative position, said means including a pair of alined plungers parallel with the axis of said members, a compressed spring between said plungers, the ends of said spring pressing against the mutually adjacent end faces of said plungers, said end faces also being exposed to fluid pressure within said inlet channel, shoulders within the outer member and shoulders on the inner member engaged by the mutually remote end faces of said plungers when the members are in central relative position, whereby movement of the inner member from central relative position imparts movement in the same direction to one only of said pair of plungers.

FRANCIS W. DAVIS.